| United States Patent [19] | [11] Patent Number: 4,943,682 |
| Klobucar et al. | [45] Date of Patent: Jul. 24, 1990 |

[54] PRODUCTION OF PARTICULATE POLYIMIDE POLYMERS

[75] Inventors: W. Dirk Klobucar; Allan A. Eisenbraun; Ronald C. Zumstein, all of Baton Rouge, La.

[73] Assignee: Ethyl Corporation, Richmond, Va.

[21] Appl. No.: 284,674

[22] Filed: Dec. 15, 1988

[51] Int. Cl.$^5$ ............................................. C08G 69/26
[52] U.S. Cl. ..................... 528/353; 528/126; 528/128; 528/172; 528/176; 528/183; 528/229
[58] Field of Search ............... 528/176, 172, 353, 229, 528/125, 126, 128, 183

[56] References Cited

U.S. PATENT DOCUMENTS 4,203,922  5/1980  Jones et al. ......................... 528/125
4,413,117  11/1983  Reiter et al. ........................ 528/497

FOREIGN PATENT DOCUMENTS 1062435  3/1967  United Kingdom .

*Primary Examiner*—John Kight, III
*Assistant Examiner*—M. L. Moore
*Attorney, Agent, or Firm*—John F. Sieberth; Richard J. Hammond

[57] ABSTRACT

Described is a process for producing, in particulate form, aromatic polyimides based on one or more 2,2-bis[4-(aminophenoxy)-phenyl]hexafluoropropanes. The process involves forming, heating and agitating in a medium composed of dipolar aprotic solvent and liquid aromatic hydrocarbon solvent, a homogeneous solution of a polyamic acid derived from a substantially equimolar mixture of (i) an aromatic tetracarboxylic dianhydride and (ii) a 2,2-bis[4-(aminophenoxy)phenyl]hexafluoropropane, such that a separate phase of particulate aromatic polyimide is formed in such medium. The process avoids difficulties caused by the tendency of the wet polyimide polymer to agglomerate into stringy or tacky masses which can foul reactor and agitator surfaces.

29 Claims, No Drawings

PRODUCTION OF PARTICULATE POLYIMIDE POLYMERS

TECHNICAL FIELD

This invention relates to production of finely divided polyimide polymers suitable for use in powder coating operations and for forming composites and molded products.

BACKGROUND

Aromatic polyimides are normally prepared from an aromatic tetracarboxylic dianhydride and an aromatic primary diamine. When these materials are reacted at relatively low temperatures in a suitable solvent, typically a dipolar aprotic solvent such as N-methylpyrrolidone or N,N-dimethylacetamide, an aromatic polyamic acid is formed, usually as a viscous solution sometimes referred to as a varnish. When heated to a temperature above about 140° C. imidization occurs such that a polyimide polymer is formed.

It is known from Japan Kokai 57-200452 and Japan Kokai 57-200453 that finely divided aromatic polyimides of a variety of aromatic tetracarboxylic acids and aromatic diamines can be formed by rapidly heating to 160°-300° C. solutions of carboxy anhydride group-free polymers in a polar organic solvent such as N-methylpyrrolidone, N,N-dimethylformamide, etc. In this way, polyimide powders suitable for use in compression molding were formed from solutions of such copolymers as 3,3',4,4'-biphenyltetracarboxylic acid-4,4'-diaminodiphenyl ether copolymer, pyromellitic acid-4,4'-diaminodiphenyl ether copolymer, and 3,3',4,4'-biphenyltetracarboxylic acid-4,4'-diaminodiphenylmethane copolymer.

Polyimide polymers based on use of 2,2-bis[4-(4-aminophenoxy)phenyl]hexafluoropropane as the sole or predominant aromatic primary diamine are of considerable interest because of their desirable high temperature properties. However the production of such polymers in powder form presents a number of problems. Certain prior methods for converting the polyamic acid to the corresponding polyimide yield the polyimide in the form of solids which require grinding, and substantial portions of the product may not even be amenable to grinding. Other prior methods are fraught with difficulties caused by the tendency of the wet polyimide polymer to agglomerate into stringy or tacky masses which can foul reactor and agitator surfaces. Further, such tacky masses cannot be removed from the reactor in any commercially practical manner. Moreover, the solvent tends to remain occluded in such swollen, tacky masses.

A desirable contribution to the art would be a process in which the foregoing difficulties may be eliminated, or at least greatly reduced. This invention is deemed to constitute such a contribution.

THE INVENTION

This invention provides a process for the production, in particulate form, of aromatic polyimides derived from a 2,2-bis[4-(aminophenoxy)phenyl]hexafluoropropane as the sole or predominant aromatic primary diamine component thereof, which process comprises forming, heating and agitating in a medium composed of dipolar aprotic solvent and liquid aromatic hydrocarbon solvent, a homogeneous solution of a polyamic acid derived from a substantially equimolar mixture of (i) an aromatic tetracarboxylic dianhydride and (ii) a 2,2-bis[4-(aminophenoxy)phenyl]hexafluoropropane such that (a) the solution contains at least 50 percent by weight of the liquid aromatic hydrocarbon based on total solution, and (b) a separate phase of particulate aromatic polyimide is formed in such medium. In one of its preferred forms the process comprises (a) forming a homogeneous solution of (i) an aromatic polyamic acid formed from a 2,2-bis[4-(aminophenoxy)phenyl]hexafluoropropane as the sole or predominant aromatic primary diamine component thereof, and (ii) a medium composed of from 2 to 6 (preferably 2 to 4) parts by weight of dipolar aprotic solvent per part by weight of polyamic acid, and from about 1 to about 4 (preferably 1.5 to 4) parts by weight of liquid aromatic hydrocarbon solvent per part by weight of the combination of polyamic acid and dipolar aprotic solvent; and then (b) heating such solution with agitation such that imidization of the polyamic acid occurs and a separate phase of particulate aromatic polyimide is formed in the medium used. The process may be conducted such that water formed during the imidization is removed from the reaction system essentially as soon as it is formed, as by use of suitable apparatus such as a reflux condenser and a Dean-Stark trap. Alternatively, and surprisingly, the process may be conducted in a closed reaction system such that water formed during the imidization remains within the reaction system. Such closed system operation is preferred.

The use of the above solvent system enables the reaction intermediates to remain in solution prior to imidization. And, when the imidization reaction has been fully or partially completed, the polyimide polymer precipitates from solution in finely divided form. The formation of objectionable agglomerates or stringy taffy-like residues is thus avoided, and the reaction mixture can easily be recovered, as by draining the reactor.

In a preferred embodiment, the homogeneous solution of (a) above is formed by adding the liquid aromatic hydrocarbon solvent portionwise to a mixture of the aromatic polyamic acid and the dipolar aprotic solvent while subjecting the resultant mixture to agitation. In some cases this operation may be conducted at ambient temperatures, as for example when adding aromatic hydrocarbons such as xylenes to an aromatic polyamic acid formed from pyromellitic dianhydride and 2,2-bis[4-(4-aminophenoxy)phenyl]-hexafluoropropane. On the other hand sometimes this operation should be conducted at elevated temperatures below about 130° C., preferably at an elevated temperature within the range of about 100 and about 125° C., as for example when adding xylene or the like to an aromatic polyamic acid formed from benzophenonetetracarboxylic acid dianhydride and 2,2-bis[4-(4-aminophenoxy)phenyl]-hexafluoropropane.

Still another embodiment of this invention is to wash the particulate aromatic polyimide, formed as above, with a suitable solvent having a boiling point below about 160° C. and drying the mixture with agitation under an inert gas stream or under vacuum. Various types of drying apparatus may be used for this purpose, including ribbon dryers, rotary vacuum driers, and the like. It is particularly preferred to conduct the drying of the agitated product initially under the flow of inert gas or under vacuum at ambient temperature and thereafter at a temperature in the range of 140° to 250° C.

The aromatic polyamic acid used in the process is preferably formed by reaction between an aromatic tetracarboxylic acid dianhydride and a 2,2-bis[4-(aminophenoxy)phenyl]hexafluoropropane co-reactive therewith to produce a polyamic acid. The aromatic tetracarboxylic acid dianhydrides which may be employed in such synthesis reactions may be represented by the formula

wherein A is an aromatic residue. Illustrative compounds of this type include
pyromellitic acid dianhydride
3,3',4,4'-benzophenonetetracarboxylic acid dianhydride
4,4'-oxydiphthalic acid dianhydride
2,3,6,7-naphthalenetetracarboxylic acid dianhydride
3,3',4,4'-diphenyltetracarboxylic acid dianhydride
1,2,5,6-naphthalenetetracarboxylic acid dianhydride
2,2-bis(3,4-dicarboxyphenyl)propane dianhydride
1,1-bis(3,4-dicarboxyphenyl)ethane dianhydride
bis(3,4-dicarboxyphenyl)methane dianhydride
3,4,9,10-perylenetetracarboxylic acid dianhydride
and the like. Pyromellitic acid dianhydride and 3,3',4,4'-benzophenonetetracarboxylic acid dianhydride are preferred reactants.

The diamine portion of the polymers is based on a 2,2-bis-[4-(aminophenoxy)phenyl]hexafluoropropane, such as 2,2-bis[4-(3-aminophenoxy)phenyl]hexafluoropropane or 2,2-bis[4-(4-aminophenoxy)phenyl]hexafluoropropane, and mixtures thereof, as the sole or as the predominant (more than 50 mol %) diamine reactant used in producing the polyamic acid. When employing co-polyamic acids wherein one or a mixture of 2,2-bis-[4-(aminophenoxy)phenyl]hexafluoropropanes constitute the prodominant aromatic primary diamine component, the balance (less than 50 mol %) of the aromatic diamine(s) used will be one or more aromatic or heterocyclic primary diamines such as
p-phenylenediamine
m-phenylenediamine
4,4'-diaminobiphenyl
3,3'-diaminobiphenyl
4,4'-methylenedianiline
4,4'-diaminodiphenylsulfide
3,3'-diaminodiphenylsulfide
4,4'-diaminodiphenylsulfone
3,3'-diaminodiphenylsulfone
4,4'-diaminodiphenylketone
3,3'-diaminodiphenylketone
4,4'-oxydianiline
3,3'-diaminodiphenylether
1,4-diaminonaphthalene
2,6-diaminopyridine
3,5-diaminopyridine
2,6-diaminotoluene
2,4-diaminotoluene
1,1-bis(3-aminophenyl)ethane
2,2-bis(4-aminophenyl)propane
2,2-bis(3-aminophenyl)hexafluoropropane
2,2-bis(4-aminophenyl)hexafluoropropane
2,2-bis[4-(3-aminophenoxy)phenyl]hexafluoropropane
2,2-bis[4-(4-aminophenoxy)phenyl]hexafluoropropane
and the like.

The aromatic polyamic acids are preferably formed in a dipolar aprotic solvent system. Examples of dipolar aprotic solvents include N,N-dimethylformamide, N,N-dimethylacetamide, N,N-diethylformamide, N,N-diethylacetamide, N-methylpyrrolidone, dimethylsulfoxide, sulfolane, and the like, including mixtures of two or more such solvents.

The molecular weights of the polyamic acids used are not particularly high—when the polyamic acids are dissolved in a dipolar aprotic solvent, the intrinsic viscosity of the solution, typically measured at 25° C., should be less than 1.5 dL/g.

Examples of the aromatic hydrocarbon solvents which may be used in the process of this invention include
toluene
o-xylene
m-xylene
p-xylene
1,2,3-trimethylbenzene
1,2,4-trimethylbenzene
1,3,5-trimethylbenzene
1,2-diethylbenzene
1,3-diethylbenzene
1,4-diethylbenzene
3,5-diethyltoluene
n-butylbenzene
3-propyltoluene
4-propyltoluene
tetrahydronaphthalene
1,2,3,4-tetramethylbenzene
1,2,3,5-tetramethylbenzene
and the like, including mixtures of two or more such solvents, such as mixed xylenes, BTX (blends or fractions containing benzene, toluene and xylene), etc.

Other solvents, such as ketones, ethers, and the like may also be included in the homogeneous solutions formed in (a) above, provided that such co-solvents do not prevent the polyimide from precipitating from solution in proper physical form during the course of the ensuing thermal reaction in step (b).

In step (b) above, thermal energy is used to insure that a polyimide is formed, which, because of its insolubility in the reaction medium, separates from the solvent system as a solid phase. The system should be agitated strenuously enough (as by efficient stirring) to cause the polyimide to separate in particulate form and to prevent the formation of excessive quantities of agglomerated particles or masses within the system.

Temperatures used in step (b) will normally fall within the range of about 130° to about 210° C., preferably within the range of about 140° to about 180° C., and most preferably within the range of about 140° to about 170° C. At temperatures between about 130° and about 150° C. it is desirable to remove the water formed in the imidization reaction essentially as soon as it is formed. At higher temperatures, the water may remain in the system (e.g., by running the reaction in a sealed autoclave) or it may be removed azeotropically as formed.

The particulate polyimide polymer may be separated or recovered from the liquid reaction medium by any suitable procedure, such as filtration, decantation, or vacuum distillation. Centrifugation, while workable, is less preferred as it tends to cause the particles to form a lumpy product when dried.

In the preferred washing step of this invention any inert solvent boiling below about 160° C. may be employed, including low boiling paraffins, cycloparaffins, chlorinated solvents, ethers, esters, ketones, etc., including mixtures of such solvents. It is important that the solvent used for washing be miscible with the aprotic solvent and thus can remove the aprotic solvent from the polymer particles. Ethyl acetate has been found particularly efficacious for this use.

After drying the product with agitation under a vacuum or under a flow of inert gas (preferably nitrogen, although argon, etc. may be used), preferably using staged drying temperatures in the manner described above, the particulate polyimide powder may be subjected to a final drying in a vacuum tray dryer at a temperature in the range of 140° to about 250° C. and at a pressure in the range of 0 to 20 mm Hg. Ordinarily grinding of the product is not required, but may be resorted to in any situation where it is deemed necessary or desirable.

Having described the basic concepts of this invention, reference will now be made to the following specific examples which are illustrative but not limitive of its practice.

Example 1 describes a run conducted in accordance with this invention wherein the solution of polyamic acid contained about 3 parts by weight of dipolar aprotic solvent per part by weight of polyamic acid, and about 2 (1.9) parts by weight of aromatic hydrocarbon per part by weight of combined polyamic acid and dipolar aprotic solvent. In Comparative Example A set forth thereafter, the system contained about 4 parts by weight of dipolar aprotic solvent per part by weight of polyamic acid, and about 0.4 part by weight of aromatic hydrocarbon per part by weight of combined polyamic acid and dipolar aprotic solvent.

EXAMPLE 1

To a 2-liter reactor containing 450 g of a polyamic acid resin solution composed of 112 g of polyamic acid (made from pyromellitic acid dianhydride and 2,2-bis[4-(4-aminophenoxy)-phenyl]hexafluoropropane) and 338 g of N-methylpyrrolidone was added 860 g of molecular sieve-dried xylene. The heater was started and when the temperature of the heater reached 150° C., the stirrer was started. The reaction mixture was heated to 160° C. and stirred at 160° C. for 3 hr at 100 rpm. At this point the heater was turned off and stirring was continued. The turbidity of the reaction mixture started to increase when the temperature of the reaction mixture reached 148° C. The reaction mixture was cooled and easily drained from the reactor (50 psi nitrogen). The reactor was rinsed twice with heptane (2×1 qt). The layer of solids which remained in the reactor just above the top of the agitator was removed. The solids were filtered, stirred with 2.0 liters of low boiling petroleum ether and filtered. The solids were again stirred with 2.0 liters of low boiling petroleum ether and filtered. The solids were air dried in a Buchner funnel for 2 hr to give 312 g of yellow powder. The powder was dried in a vacuum oven at 100°–130° C. and 0.3 mm Hg for 3 hr to give 117 g of a darker yellow powder. The powder was dried overnight at 220°–240° C. and 0.3 mm to give 108 g (98% yield) of yellow powder. About 70% of the material passed through a number 30 ASTM sieve screen, the remainder of the material was ground with a mortar and pestle and then passed through the screen.

COMPARATIVE EXAMPLE A

To the dry 2-liter reactor was added 1166 g of material made by mixing 350 g of sieve dried xylenes with 841.6 g of a polyamic acid resin solution composed of 210 g of polyamic acid (made from pyromellitic acid dianhydride and 2,2-bis[4-(4-aminophenoxy)phenyl]-hexafluoropropane) and 632 g of N-methylpyrrolidone.

The reaction mixture was heated to 165° C. while stirred at the lowest speed possible. After 1 hr of stirring at 165° C. the reaction mixture had solidified into an agglomerated mass. The reaction mixture was allowed to stir and stand for a total of 3 hours at 165° C., cooled to 74° C. and allowed to stand overnight. The reactor did not drain; instead the contents had to be removed manually. The yellow solid was scraped from the reactor and stirred for 10 min in 1625 mL of n-heptane. The solids were filtered. The solids were stirred for 20 min in 2 liters of n-heptane. The solids were filtered and then dried overnight in a vacuum oven at 240°–260° C. and 0.3 mm Hg. There was obtained 185 g (94% yield) of a much darker yellow solid of clay-like consistency which was difficult to grind with a mortar and pestle. The ground material was screened (No. 30 ASTM sieve screen). Obtained were 172.3 g of powder and 2.0 g of material which would not pass through the screen.

Examples 2 and 3 below illustrate the process of this invention as conducted on the same 2-liter scale both with and without removal of the by-product water by azeotropic distillation, and as applied to a different polyamic acid/polyimide system.

EXAMPLE 2

To a 2-liter reactor were added 756 g of sieve-dried xylene and 334 g of a polyamic acid resin solution composed of 83.5 g of polyamic acid (made from 3,3',4,4'-benzophenonetetracarboxylic acid dianhydride and 2,2-bis[4-(4-aminophenoxy)phenyl]hexafluoropropane) and 250.5 g of N-methylpyrrolidone. The reaction mixture was heated to 160° C. and stirred at 160°–166° C. for 2.5 hr. (It was observed that the mixture remained as two distinct liquid phases until the temperature reached about 145° C. when it became homogeneous. It was also observed that solids started to form in the reaction mixture when the temperature reached 159° C.) The heater was turned off and stirring was continued. When the temperature of the reaction mixture had cooled to 65° C., the reactor was easily emptied by draining (50 psi nitrogen) and rinsed twice with one liter of hexanes. A layer of particulate solids above the agitator was removed from the reactor. The solids, mainly in powder form with some small flakes therein, were filtered, stirred with 1.6 liters of hexanes and filtered. These solids were air dried in a Buchner funnel for 1 hr. The dark yellow particulate solids were dried in a vacuum oven at 110° C. and 0.3 mm Hg for 2 hr to give 85.1 g of yellow solid. This was dried overnight at 215° C. to give 77.1 g (96% yield) of product. The product was readily ground to give 72.0 g of yellow polyimide powder.

EXAMPLE 3

To the 2-liter reactor equipped with a Dean-Stark trap and a reflux condenser were added 699 g of sieve-dried xylene and 401 g of a polyamic acid resin solution composed of 100 g of polyamic acid (made from 3,3',4,4'-benzophenonetetracarboxylic acid dianhydride and 2,2-bis[4-(4-aminophenoxy)phenyl]hexafluoropropane) and 301 g of N-methylpyrrolidone. The reaction mixture was brought to reflux (142°–143° C.). A stream of nitrogen (0.5 SCFH) was passed over the reaction mixture and out the reflux condenser throughout the entire reaction period. The reaction mixture was refluxed at 142°–148° C. for 4 hr while collecting the azeotrope. After 2.5 hr, 3.5 mL of aqueous material had collected in the Dean-Stark trap. No further azeotrope was collected during the remaining 1.5 hr period. After cooling, the reactor was easily drained and rinsed twice with one liter of hexanes. A layer of particulate solids above the agitator was removed from the reactor. The solids, mainly in powder form with some small flakes therein, were filtered, rinsed with 1.5 liter of hexanes and air dried by passing air for 5 hr through the Buchner funnel containing the solids. The particulate solid was dried in a vacuum oven at 110°–115° C. and 0.3 mm Hg for 7 hr. The yellow partially-dried product (90.1 g) was dried overnight at 160° C. and greater than 30 inches of Hg vacuum. There was obtained 87.0 g (90% yield) of a bright yellow particulate solid. This was easily ground with a mortar and pestle to give 75.9 g of bright yellow polyimide powder.

Table 1 shows the physical properties of molded parts made from the products of Examples 1–3.

TABLE 1

| | Properties of Molded Specimens | | | |
|---|---|---|---|---|
| Ex. | Mold Temp, °F. | Density, g/mL | Tg, °C.* | Modulus Break, °C.** |
| 1 | 800 | 1.45 | 429 | — |
| 1 | 800 | 1.45 | 440 | — |
| 2 | 600 | 1.39 | 239 | 225 |
| 3 | 600 | 1.43 | 250 | 241 |

*From tan peak in dynamic mechanical thermal analysis (DMTS)
**Temperature at which the modulus begins to drop in DMTA Examples 4–6 below further illustrate the practice and advantages of this invention.

EXAMPLE 4

To a 10-gallon stainless steel reactor 15.36 lb of a polyamic acid resin solution made from 3,3',4,4'-benzophenone tetracarboxylic acid dianhydride and a 2,2-bis[4-(4-aminophenoxy)-phenyl]hexafluoropropane (24% polyamic acid solution in NMP, i.e., N-methylpyrrolidone) was added. With agitator turning, 39.05 lb of mixed xylenes were added slowly. The mixture was allowed to mix overnight but gave two phases after this period. The mixture was heated to 80° C. and held for 2 hours, still giving two phases. The mixture was then heated to 115° C. and finally produced a homogeneous solution after one hour. The solution was heated to about 168° C. and held for 3 hours. Upon cooling to ambient temperature, 51.2 lb of a yellow slurry was drained from reactor. The reactor was rinsed with 59.2 lb of ethyl acetate (EtOAc). The rinse and reaction slurry were combined in a 30 gallon vessel and agitated for 3 hours. The slurry was passed through a perforated bowl centrifuge with 5 mm 100% olefin bag to recover 24.7 lb of swollen solids and 80.4 lb of liquor which was discarded. The solids were reslurried in 50 lb of EtOAc for one hour and centrifuging gave 21.8 lb of swollen solids and 57.9 lb of liquor which was discarded. The solids were added to a two cubic foot ribbon dryer which had a purge of 50–60 SCFH of $N_2$ going to a condenser then to the flare. The solids were dried overnight with 20 psig steam on the jacket. A total of 2.893 lb of fine yellow polyimide powder was recovered of which 2.699 lb passed through #30 ASTM mesh screen. The remaining 0.194 lb of material was ground with mortar and pestle to pass through #30 mesh. The powder was then dried with a vacuum tray dryer at 240° C. with full vacuum for 2 days to give 2.70 lb of powder. This represents a yield of 71.5%.

EXAMPLE 5

To the 10-gallon reactor was added 15.06 lb a polyamic acid made from pyromellitic acid dianhydride and 2,2-bis[4-(4-aminophenoxy)phenyl]hexafluoropropane (24 wt percent solution of polyamic acid in NMP). With the agitator turning at 85 rpm, 38.9 lb of mixed xylenes were added in 3-8 lb portions over 4 hours. After stirring overnight, a homogeneous solution was obtained at ambient temperature. This mixture was heated to about 165° C. and held for 3 hours in a closed system. Pressure on the reactor increased to 36 psig during heating. After cooling down to ambient temperature, the reaction mass was drained from the reactor recovering 52 lb of a slurry containing fine yellow solids. The reactor was rinsed with 65 lb of EtOAC. The rinse and reaction slurry were combined in the 30 gallon vessel, agitated for one hour, and then centrifuged whereby 26.9 lb of swollen solids were recovered and 88.5 lb of liquor discarded. The swollen polyimide was reslurried in 53.5 lb of EtOAc for one hour and centrifuged. A total of 20.8 lb of wet yellow solids were recovered with 58 lb of liquor being discarded. The solids were added to a two cubic foot ribbon dryer and dried for 6 hours under the conditions in Example 4. This produced 3.19 lb of finely divided powder of which 2.867 lb passed through a #30 mesh screen. The material that did not pass was ground with mortar and pestle giving an additional 0.327 lb. The resulting powder was thoroughly dried using a vacuum tray dryer under the conditions in Example 4. A total of 2.98 lb of fine yellow powder was recovered representing an 86.5% yield.

EXAMPLE 6

In the 10 gallon reactor, 19.855 lb of polyamic acid resin solution made from 3,3',4,4'-benzophenone tetracarboxylic acid dianhydride and a 2,2-bis[4-(4-aminophenoxy)phenyl]hexafluoropropane (25% solids content in NMP) was dissolved in 50.4 lb of mixed xylenes at 115° C. for one hour. After heating the resulting solution for 3 hours at 165° C., 62.8 lb of a yellow slurry was drained from the reactor. The reactor was rinsed with 65 lb of EtOAC and this rinse was combined with the reaction mass in a 30 gallon vessel. After one hour of mixing, the slurry was passed through the centrifuge as in Example 4 recovering 20.0 lb of polyimide particles and discarding 107.8 lb of liquor. This procedure was repeated again in the 10-gallon reactor, using 18.612 lb of the polyamic acid solution and 46.0 lb of mixed xylenes, with mixing at 115° C. for 1½ hours followed by heating the resulting solution for 3 hours at 165° C. This gave 63.2 lb of a yellow slurry which was drained from the reactor. The reactor was rinsed with 77.6 lb of EtOAc and this was combined with the reaction mass. After one hour of mixing, the slurry was centrifuged as in Example 4 recovering 24.5 lb of solids and discarding 116.3 lb of liquor. The swollen polyimide from these two runs (44.5 lb) was reslurried in 125 lb EtOAc overnight and centrifuged. A total of 33.55 lb of solids was recovered and 92.48 lb of liquor discarded. The solids were added to the ribbon dryer of Examples 4 and 5 and dried with $N_2$ purge but at ambient temperature overnight. The solids were then further dried with 40 psig steam on the jacket for 4 hours. A total of 8.793 lb of fine yellow solids were collected of which 7.46 lb was smaller than #30 ASTM mesh. The remaining 1.28 lb of larger particles were quickly and easily ground to give 1.0 lb of fine powder using a hammer mill. After drying in a vacuum tray dryer as in Examples 4 and 5, 7.70 lb of fine yellow polyimide powder was recovered representing an 88.8% yield.

Comparative Examples B and C illustrate the severe problems encountered when attempting to produce powders without recourse to the process of this invention.

COMPARATIVE EXAMPLE B

To a one-liter round bottom flask containing 185.3 g of EYMYD® L-30N resin, a commercially available (Ethyl Corporation) 24 weight percent solids solution in N-methylpyrrolidone of polyamic acid from pyromellitic acid dianhydride and 2,2-bis[4-(4-aminophenoxy)-pheny]hexafluoropropane, was added 513.4 g of N-methylpyrrolidone. The slurry was heated to 190° C. for 3 hours while removing water by means of a Dean-Stark trap. After cooling to room temperature the slurry, which contained a dispersed fine yellow solid phase, did not show any signs of settling. An attempt was to filter the mixture using Whatman No. 2 filter paper, but this operation proceeded much too slowly to constitute a practical operation. Therefore the unfiltered mixture was poured into cyclohexane (1 liter) whereby a fine yellow precipitate settled to the bottom. Even so, this mixture could be filtered only very slowly through Whatman No. 2 filter paper. Accordingly, the mixture was then added to water which caused the formation of agglomerated particles of polymer which could be filtered off in a reasonable time period. The solids so recovered were dried in a vacuum oven and were found to be very difficult to grind to a powder because of their tough, granular consistency.

COMPARATIVE EXAMPLE C

Into a glass reactor equipped with a double spiral stainless steel agitator was charged 44.08 g of EYMYD® L-20N resin, a commercially available (Ethyl Corporation) 24 weight percent solids solution in N-methylpyrrolidone of polyamic acid from benzophenonetetracarboxylic acid dianhydride and 2,2-bis-[4-(4-aminophenoxy)phenyl]hexafluoropropane. The reactor was partially immersed in an oil bath and the temperature was increased at the rate of 2.5° C. per minute. When the bath temperature reached 167° C., small bubbles appeared in the solution which, at this point, exhibited a relatively low viscosity. When the bath temperature reached 220° C., large gas bubbles appeared in the system and the mixture became viscous, gel-like and cloudy. At this point, the temperature of the bath was increased at the rate of about 0.5° C. per minute. The mixture gradually became extremely viscous and wrapped itself around the agitator. Heating was terminated when the bath temperature reached approximately 270° C. The reaction mixture was a non-uniform, very tough material which was wrapped around the double spiral stainless steel agitator. No powder resulted and this procedure was found totally unsuitable for producing the polyimide in particulate form. In fact, to remove the material from the agitator, it was found necessary to burn it off by placing the agitator with the material adhered thereto in a thermal oven and heating to 650° C. for a period of time long enough to completely burn off the polyimide polymer.

The above disclosure has been presented for purposes of illustration and not limitation. As can readily be appreciated by those skilled in the art, this invention is susceptible to considerable variation in its practice within the spirit and scope of the ensuing claims.

What is claimed is:

1. A process for the production, in particulate form, of aromatic polyimides derived from a 2,2-bis[4-(aminophenoxy)phenyl]-hexafluoropropane as the sole or predominant aromatic primary diamine component thereof, which process comprises forming, heating and agitating in a medium composed of dipolar aprotic solvent and liquid aromatic hydrocarbon solvent, a homogeneous solution of a polyamic acid derived from a substantially equimolar mixture of (i) an aromatic tetracarboxylic dianhydride and (ii) a 2,2-bis[4-(aminophenoxy)phenyl]hexafluoropropane such that (a) said solution contains at least 50 percent by weight of the liquid aromatic hydrocarbon based on total solution, and (b) a separate phase of particulate aromatic polyimide is formed in said medium.

2. A process of claim 1 wherein the 2,2-bis[4-(aminophenoxy)-phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride or pyromellitic acid dianhydride, or both.

3. A process of claim 2 wherein the liquid aromatic hydrocarbon solvent is composed predominantly or entirely of one or more xylene isomers 4. A process for the production, in particulate form, of aromatic polyimides derived from a 2,2-bis[4-(aminophenoxy)phenyl]-hexafluoropropane as the sole or predominant aromatic primary diamine component thereof, which process comprises:
   (a) forming a homogeneous solution of (i) an aromatic polyamic acid derived from a 2,2-bis[4-(aminophenoxy)phenyl]hexafluoropropane or a mixture of 2,2-bis[4-(aminophenoxy)phenyl]hexafluoropropanes as the sole or predominant aromatic primary diamine component thereof, in (ii) a medium composed of from about 2 to about 6 parts by weight of dipolar aprotic solvent per part by weight of polyamic acid, and from about 1 to about 4 parts by weight of liquid aromatic hydrocarbon solvent per part by weight of the combination of polyamic acid and dipolar aprotic solvent; and then
   (b) heating such solution with agitation to a temperature sufficient to cause imidization of the polyamic acid and formation of a separate phase of particulate aromatic polyimide.

5. A process of claim 4 wherein water formed during the imidization is removed from the reaction system essentially as soon as it is formed.

6. A process of claim 4 wherein the heating of the solution is conducted in a closed reaction system such that water formed during the imidization remains within the reaction system.

7. A process of claim 4 wherein said homogeneous solution is formed by adding the liquid aromatic hydrocarbon solvent portionwise to a mixture of the aromatic polyamic acid and the dipolar aprotic solvent while subjecting the resultant mixture to agitation.

8. A process of claim 4 further comprising washing the particulate aromatic polyimide with a solvent having a boiling point below about 160° C. and drying the mixture with agitation under vacuum or under an inert gas stream.

9. A process of claim 8 wherein the drying is conducted initially at ambient temperature and thereafter at a temperature in the range of 140° to 250° C.

10. A process of claim 8 wherein the solvent having a boiling point below about 160° C. is a carboxylic acid ester.

11. A process of claim 8 wherein the solvent having a boiling point below about 160° C. is ethyl acetate.

12. A process of claim 4 wherein the aromatic polyamic acid is polyamic acid formed in dipolar aprotic solvent from an aromatic tetracarboxylic acid dianhydride and a 2,2-bis[4-(aminophenoxy)-phenyl]hexafluoropropane.

13. A process of claim 4 wherein the 2,2-bis[4-(aminophenoxy)-phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride.

14. A process of claim 4 wherein the 2,2-bis[4-(aminophenoxy)-phenyl]hexafluoropropane is 2,2-bis[4-(4-aminophenoxy)phenyl]hexafluoropropane and the aromatic tetracarboxylic acid dianhydride is pyromellitic acid dianhydride.

15. A process of claim 4 wherein the liquid aromatic hydrocarbon solvent is composed predominantly or entirely of one or more xylene isomers.

16. A process for the production of aromatic polyimides in particulate form which comprises:

(a) adding liquid aromatic hydrocarbon solvent portionwise and with agitation to a mixture of (i) aromatic polyamic acid derived from a 2,2-bis[4-(aminophenoxy)phenyl]hexafluoropropane or a mixture of 2,2-bis[4-(aminophenoxy)phenyl]hexafluoropropanes as the sole or predominant aromatic primary diamine component thereof, and (ii) dipolar aprotic solvent to form a homogeneous solution of the aromatic polyamic acid in a reaction medium composed of from about 2 to about 4 parts by weight of dipolar aprotic solvent per part by weight of polyamic acid, and from about 1 to about 4 parts by weight of liquid aromatic hydrocarbon solvent per part by weight of the combination of polyamic acid and dipolar aprotic solvent;

(b) heating such solution with agitation and to a temperature sufficient to cause imidization of the polyamic acid and formation of a separate phase of particulate aromatic polyimide;

(c) washing the particulate aromatic polyimide with a solvent having a boiling point below about 100° C.; and (d) drying the washed aromatic polyimide with agitation under vacuum or under an inert gas stream.

17. A process of claim 16 wherein water formed during the imidization is removed from the reaction system essentially as soon as it is formed.

18. A process of claim 16 wherein the heating of the solution is conducted in a closed reaction system such that water formed during the imidization remains within the reaction system.

19. A process of claim 16 wherein the drying is conducted initially at ambient temperature and thereafter at a temperature in the range of about 140° to about 250° C.

20. A process of claim 16 wherein the aromatic polyamic acid is polyamic acid formed by reaction between an aromatic tetracarboxylic acid dianhydride and a 2,2-bis[4-(aminophenoxy)phenyl]hexafluoropropane in N-methylpyrrolidone, and wherein the dipolar aprotic solvent in said homogeneous solution is composed predominantly or entirely of N-methylpyrrolidone.

21. A process of claim 16 wherein the 2,2-bis[4-(aminophenoxy)-phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride.

22. A process of claim 16 wherein the 2,2-bis[4-(aminophenoxy)-phenyl]hexafluoropropane is 2,2-bis[4-(4-aminophenoxy)phenyl]hexafluoropropane and the aromatic tetracarboxylic acid dianhydride is pyromellitic acid dianhydride.

23. A process of claim 16 wherein the 2,2-bis[4-(aminophenoxy)-phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride, and wherein the portionwise addition of the liquid aromatic hydrocarbon solvent to the agitated mixture of aromatic polyamic acid is conducted at a temperature within the range of about 25° to about 130° C.

24. A process of claim 16 wherein the 2,2-bis[4-(aminophenoxy)-phenyl]hexafluoropropane is 2,2-bis[4-(4-aminophenoxy)phenyl]hexafluoropropane and the aromatic tetracarboxylic acid dianhydride is pyromellitic acid dianhydride, and wherein the portionwise addition of the liquid aromatic hydrocarbon solvent to the agitated mixture of aromatic polyamic acid is conducted at a temperature within the range of about 25° to about 130° C.

25. A process of claim 16 wherein the solvent having a boiling point below about 100° C. is a carboxylic acid ester.

26. A process of claim 16 wherein the solvent having a boiling point below about 100° C. is ethyl acetate.

27. A process of claim 16 wherein the liquid aromatic hydrocarbon solvent is composed predominantly or entirely of one or more xylene isomers.

28. A process of claim 16 wherein the 2,2-bis[4-(aminophenoxy)-phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride or pyromellitic acid dianhydride, or both; wherein water formed during the imidization is removed from the reaction system essentially as soon as it is formed; and wherein the solvent having a boiling point below about 100° C. is a carboxylic acid ester.

29. A process of claim 16 wherein the 2,2-bis[4-(aminophenoxy)-phenyl]hexafluoropropane is 2,2-bis[4-(4-aminophenoxy)phenyl]hexafluoropropane and the aromatic tetracarboxylic acid dianhydride is benzophenonetetracarboxylic acid dianhydride or pyromellitic acid dianhydride, or both; wherein the heating of the solution is conducted in a closed reaction system such that water formed during the imidization remains within the reaction system; and wherein the solvent having a boiling point below about 100° C. is a carboxylic acid ester.

* * * * *